(12) United States Patent
Naito

(10) Patent No.: US 7,532,346 B2
(45) Date of Patent: May 12, 2009

(54) INFORMATION COLLECTING APPARATUS, REBOOTING METHOD, PROGRAM, AND REMOTE MAINTENANCE SYSTEM

(75) Inventor: Yoshiko Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 953 days.

(21) Appl. No.: 10/853,153

(22) Filed: May 26, 2004

(65) Prior Publication Data
US 2004/0260978 A1 Dec. 23, 2004

(30) Foreign Application Priority Data
Jun. 6, 2003 (JP) ............................. 2003-162155

(51) Int. Cl.
*G06F 15/00* (2006.01)
*G06F 3/12* (2006.01)
(52) U.S. Cl. .................... 358/1.15; 358/1.14; 358/1.16; 358/1.1
(58) Field of Classification Search ................ 358/1.14, 358/1.1, 1.15, 1.16, 1.9; 714/32, 36; 713/1–100, 713/300–340; 375/148, 150; 709/220
See application file for complete search history.

(56) References Cited

U.S. PATENT DOCUMENTS

| 6,598,160 | B1 * | 7/2003 | Mano ............................. 713/2 |
| 2002/0078183 | A1 * | 6/2002 | Helms ........................ 709/220 |
| 2003/0231702 | A1 * | 12/2003 | Oates et al. .................. 375/148 |
| 2005/0064820 | A1 * | 3/2005 | Park et al. ................ 455/67.11 |

FOREIGN PATENT DOCUMENTS

JP       2002-297409        10/2002

* cited by examiner

*Primary Examiner*—King Y Poon
*Assistant Examiner*—Iriana Cruz
(74) *Attorney, Agent, or Firm*—Fitzpatrick, Cella, Harper & Scinto

(57) ABSTRACT

To execute a rebooting process as necessary without missing a count number, whether a locally-connected apparatus is included in apparatuses as monitoring targets or not is discriminated. If it is determined that the locally-connected apparatus is included in apparatuses as monitoring targets, the rebooting process is not executed. If it is determined that the locally-connected apparatus is not included in apparatuses as monitoring targets, the rebooting process is executed.

9 Claims, 11 Drawing Sheets

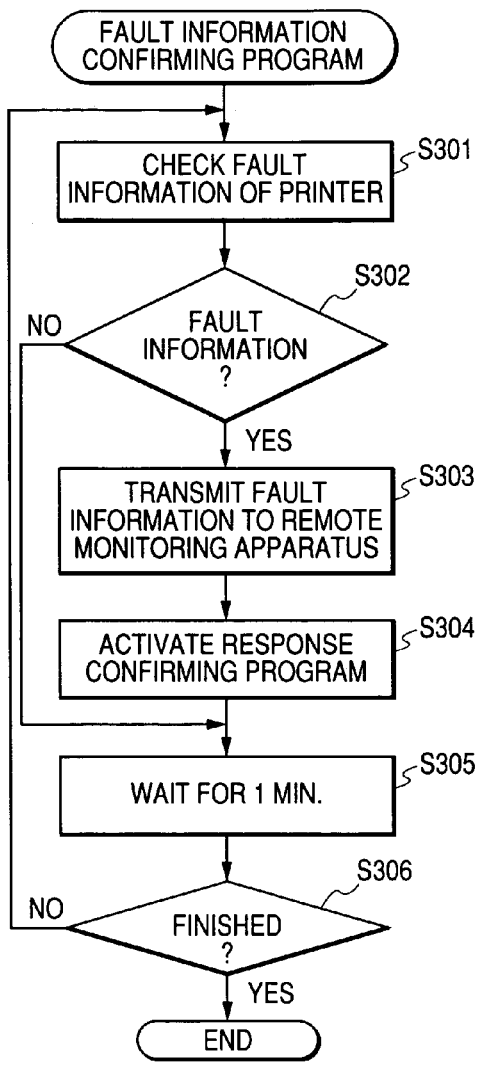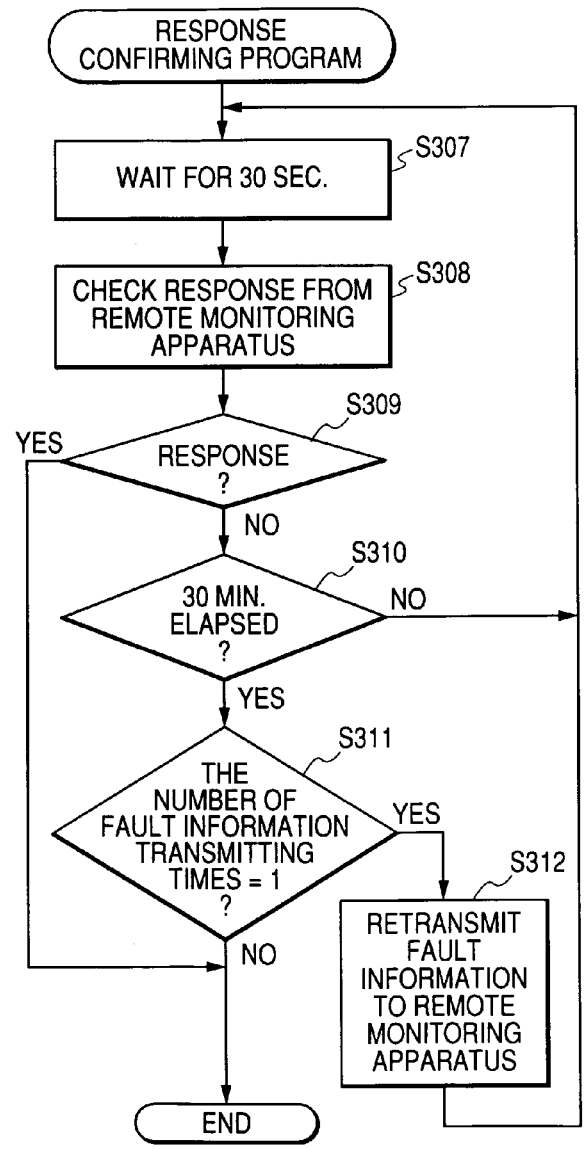
FIG. 3A
FIG. 3B

FIG. 7

| LIST OF COPYING APPARATUSES | | ADD (SERIAL)... | ADD (NETWORK)... | DELETE... |
|---|---|---|---|---|
| NAME OF COPYING APPARATUS / MODEL NAME | MODEL NO. | MAC ADDRESS | IP ADDRESS | COUNTER |
| ○ BUSINESS DEPARTMENT 22 iR5000 | DEV000001 | AABBCCDDEE | 192.168.0.101 | 21512 |
| ○ DEVELOPMENT HEAD DEPARTMENT iR3200 | DEV000002 | AABBCCDDEF | 192.168.0.102 | 9120 |
| ○ GENERAL AFFAIRS SECTION GP605 | DEV000003 | -- | -- | 120 |

ADDITION OF SERIAL CONNECTED COPYING APPARATUS

DESIGNATE COPYING APPARATUS TO BE ADDED.

MODEL NO.: [            ]

[OK] [CANCEL]

ADD NETWORK CONNECTED COPYING APPARATUS

DESIGNATE COPYING APPARATUS TO BE ADDED.

MODEL NO.: [            ]
MAC ADDRESS: [            ]
IP ADDRESS: [            ]

[OK] [CANCEL]

*FIG. 8*

| ID | IP ADDRESS | MAC ADDRESS |
|---|---|---|
| DEV00000 | 192.168.0.1 | 005001234567 |
| DEV00001 | 0.0.0.0 | 000000000000 |
| DEV00002 | 192.168.0.14 | 00AA00213451 | ured
INFORMATION COLLECTING APPARATUS, REBOOTING METHOD, PROGRAM, AND REMOTE MAINTENANCE SYSTEM

BACKGROUND OF THE INVENTION

1. Field of the Invention

The invention relates to a remote maintenance system for managing devices such as copying apparatus, printer, computer, and the like existing in remote places.

2. Related Background Art

As disclosed in Japanese Patent Application Laid-Open No. 2002-297409, such a technique that a user side managing apparatus receives a firmware write command from a user side remote apparatus and rewrites and reactivates firmware of an image forming apparatus at write possible time has been known.

When the image forming apparatus does not have ability to receive an accumulated print count number obtaining request from the user side managing apparatus but has only ability to merely notify that printing has been performed one by one upon printing, in order to obtain the accumulated count number, the user side managing apparatus needs to accumulate the number of print notifying times from the image forming apparatus. The print count number is important data for charging. In the user side managing apparatus for managing such an image forming apparatus, when rebooting is necessary, if the rebooting is immediately performed, a print notification cannot be received and the print count number is missed. Upon rebooting, it is necessary to reboot in consideration of an obtaining method of the accumulated print count number of the image forming apparatus which is managed by the user side managing apparatus.

SUMMARY OF THE INVENTION

To solve the above problem, it is an object of the invention to execute a rebooting process as necessary without missing a count number.

To accomplish the above object, according to the invention, there is provided an information collecting apparatus comprising:

a discriminating unit for discriminating whether or not an apparatus which is locally connected is included in apparatuses as targets of monitoring; and an executing unit which does not execute a rebooting process if it is determined by the discriminating unit that the locally-connected apparatus is included in the apparatuses as monitoring targets, and which executes the rebooting process if it is determined by the discriminating unit that the locally-connected apparatus is not included in the apparatuses as monitoring targets.

BRIEF DESCRIPTION OF THE DRAWINGS

FIGS. 3A and 3B are flowcharts for monitoring fault information;

FIG. 7 is a diagram showing an example of a registration/deletion designating display screen of a monitoring image forming apparatus;

FIG. 8 is a table showing an example of an information holding format of the monitoring image forming apparatus in an information collecting apparatus;

DETAILED DESCRIPTION OF THE PREFERRED EMBODIMENT

Figure 1:
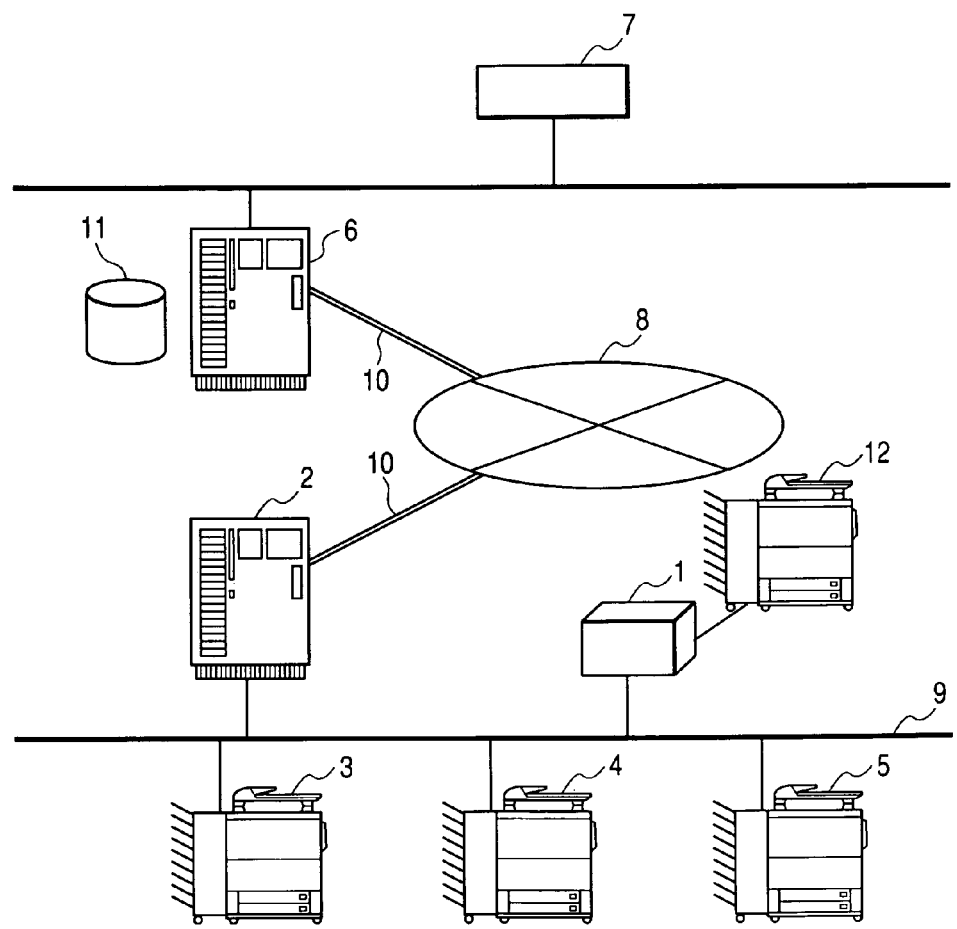
FIG. 1 is a diagram showing a whole system in an embodiment.

FIG. 1 is a diagram showing a whole system in an embodiment. A center side management server 6 and a base point side management server 2 can communicate with each other by a predetermined protocol 10 through a communication line 8 such as Internet or the like.

The center side management server and the base point side management server are connected by a specific protocol 10 through Internet 8. A general protocol (SMTP) and authentication are also provided in order to prevent an illegal access and exceed a firewall.

Although only one base point side management server is shown in FIG. 1, actually, a plurality of base point side management servers and the center side management server which unitarily manages those plurality of base point side management servers can communicate with each other through the line.

Reference numerals 3, 4, 5, and 12 in FIG. 1 denote devices. A printer (including an electrophotographic system and an ink jet system) as an image forming apparatus, a scanner, a facsimile apparatus, a digital hybrid apparatus in which a printer function and a facsimile function are integratedly provided, a personal computer, a print server, and the like can be mentioned as devices. The image forming apparatus will be described in detail hereinafter. An information collecting apparatus 1 collects information such as statuses of the apparatuses 3 to 5, residual amount of toner, the number of printing times, and the like. Further, the information collecting apparatus 1 is connected to the apparatus 12 by a serial interface (I/F) and collects information such as the number of printing times and the like.

Figure 2:
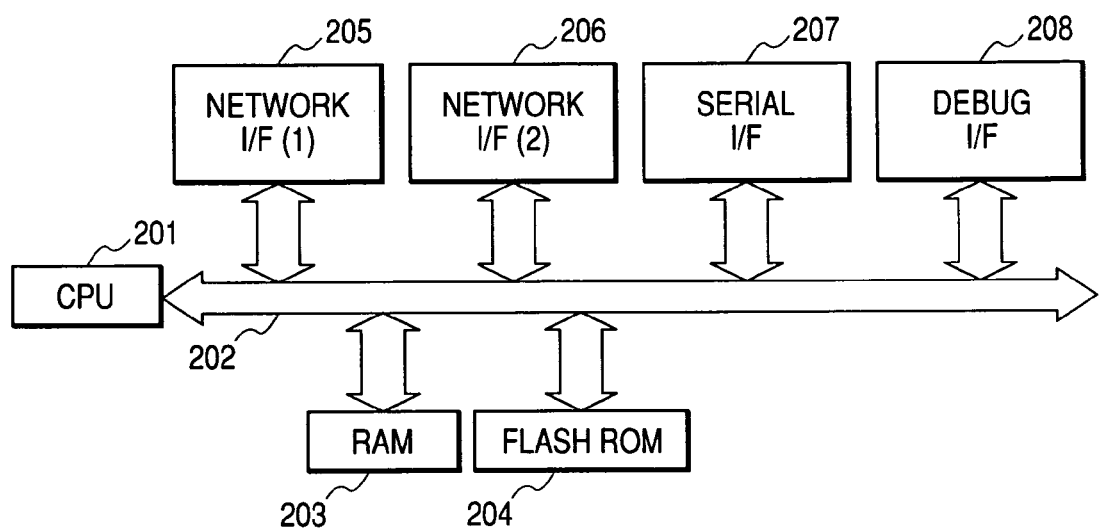
FIG. 2 is a constructional diagram of a hardware block.

FIG. 2 is a constructional diagram of a hardware block of the information collecting apparatus 1 shown in FIG. 1. The information collecting apparatus 1 is constructed by: a CPU 201; a bus 202 for transmitting and receiving data between component parts, which will be explained hereinbelow; a RAM 203 in which information can be electrically stored and rewritten; a flash ROM 204 which is electrically rewritable and in which information can be stored even if a power source is turned off; two network I/F 205 and 206 for exchanging information with an outside via a network; a serial I/F 207 for exchanging information by RS232c serial communication; and a debug I/F 208 as a serial communicating unit which is similarly used for a debug application.

FIGS. 3A, 3B, 4A, and 4B are flowcharts for the information collecting apparatus 1 shown in FIG. 1.

A case where information transmission to the apparatuses 1 and 2 or 7 is executed by SMTP and information reception therefrom is executed by POP will now be described.

FIGS. 3A and 3B are flowcharts for monitoring fault information in a printer monitoring apparatus. A fault monitoring section is constructed by a fault information confirming program and a response confirming program.

The fault information confirming program will now be described with reference to the flowchart of FIG. 3A.

In step S301, the fault information of the printers 3 to 5 is obtained by a specific protocol through a network 9.

If it is determined in step S302 that the fault information could be obtained, the obtained fault information is transmitted to the server 2 or 6 in step S303.

In step S304, the response confirming program of FIG. 3B is activated in order to confirm that the fault information has correctly been transmitted to the server 2 or 6.

In step S305, the apparatus waits for a predetermined time, for example, one minute in the flowchart.

If it is determined in step S306 that an instruction to finish the program has been made, the program is finished. If NO, the processing routine is returned to step S301 and the subsequent processes are executed.

If it is determined in step S302 that the fault information could not be obtained, processes in step S305 and subsequent steps are executed.

The response confirming program will now be described with reference to FIG. 3B.

In step S307, the apparatus waits for a predetermined time, for example, 30 seconds in the flowchart.

In step S309, the presence or absence of a response from the server 2 or 6 is discriminated by inquiring of a POP server.

If there is the response in step S309, that is, if response mail is received from the server 2 or 6, the processing routine is finished.

If it is determined in step S309 that there is no response, processes in step S310 and subsequent steps are executed.

If it is determined in step S310 that the waiting time does not exceed predetermined maximum response confirming time, that is, 30 minutes in the flowchart, the processes in step S307 and subsequent steps are executed. That is, the response discriminating process is subsequently executed.

If it is determined in step S310 that the waiting time exceeds the predetermined maximum response confirming time, processes in step S311 and subsequent steps are executed.

If it is determined in step S311 that the number of fault information transmitting times is equal to a predetermined number, that is, one time in the flowchart, the fault information is transmitted again to the server 2 or 6 in step S312 and the processes in step S307 and subsequent steps are executed.

If it is determined in step S311 that the number of fault information transmitting times exceeds the predetermined number, the processing routine is finished.

Figure 4A:
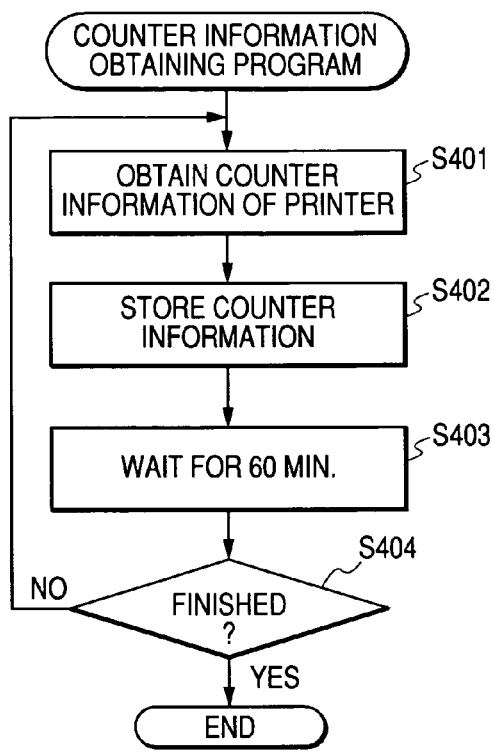
FIGS. 4A and 4B are flowcharts for collecting a counter information.
Figure 4B:
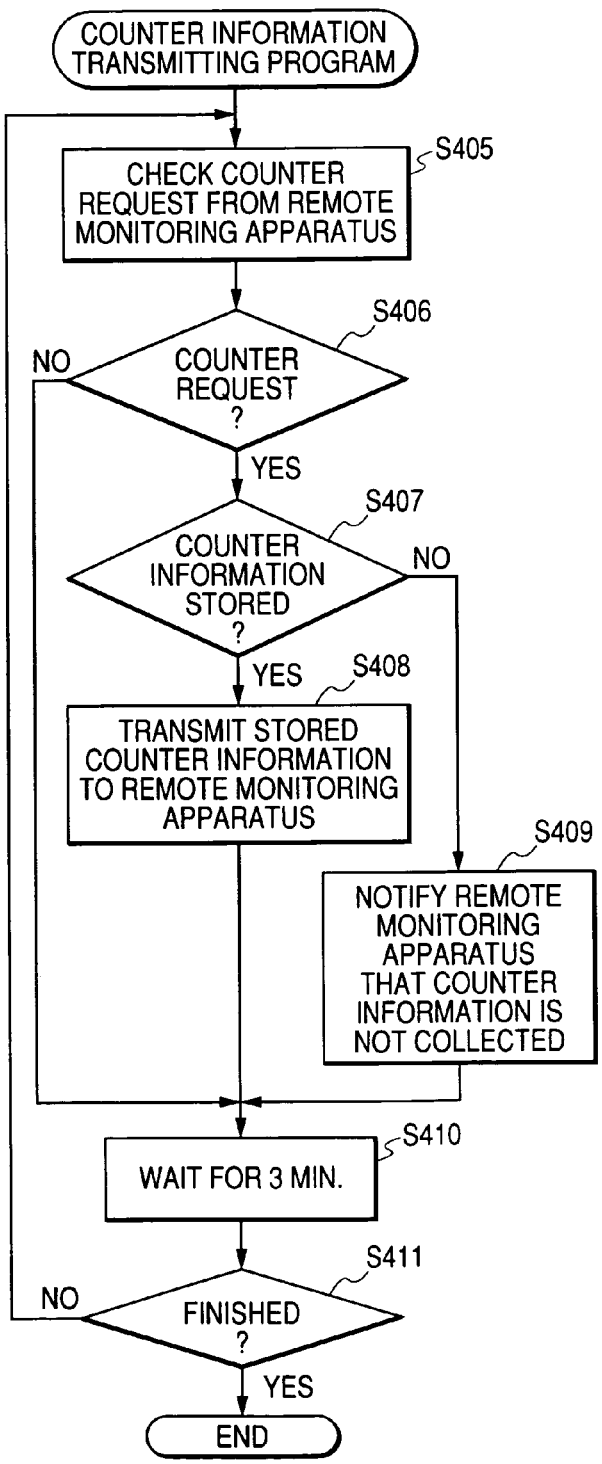

FIGS. 4A and 4B are flowcharts for collecting the count number in the printer monitoring apparatus. A count number collecting section is constructed by a counter information obtaining program and a counter information transmitting program.

The counter information obtaining program will now be described with reference to the flowchart of FIG. 4A.

In step S401, the count numbers (the numbers of print sheets) of the printers 3 to 5 are obtained by the specific protocol through the network 9.

In step S402, the counter information obtained from the printers is stored into a file.

In step S403, the apparatus waits for a predetermined time, for example, 60 minutes in the flowchart.

If it is determined in step S404 that an instruction to finish the program has been made, the program is finished. If NO, the processing routine is returned to step S401 and processes in step S401 and subsequent steps are executed.

The counter information transmitting program will now be described with reference to the flowchart of FIG. 4B.

In step S405, the POP server is inquired about the presence or absence of the counter information transmitting request mail from the server 2 or 6.

If it is determined in step S406 that there is the request for the counter information, processes in step S407 and subsequent steps are executed.

If it is determined in step S407 that the counter information has been stored in the file, the stored counter information is transmitted to the server 2 or 6 in step S408.

If it is determined in step S407 that the counter information is not stored in the file, information showing that the counter information is not collected yet is transmitted to the server 2 or 6 in step S409.

In step S410, the apparatus waits for a predetermined time, for example, 3 minutes in the flowchart.

If it is determined in step S411 that an instruction to finish the program has been made, the program is finished. If NO, the processing routine is returned to step S405 and the subsequent processes are executed.

If it is determined in step S406 that there is no request for the counter information, processes in step S410 and subsequent steps are executed.

Figure 5:
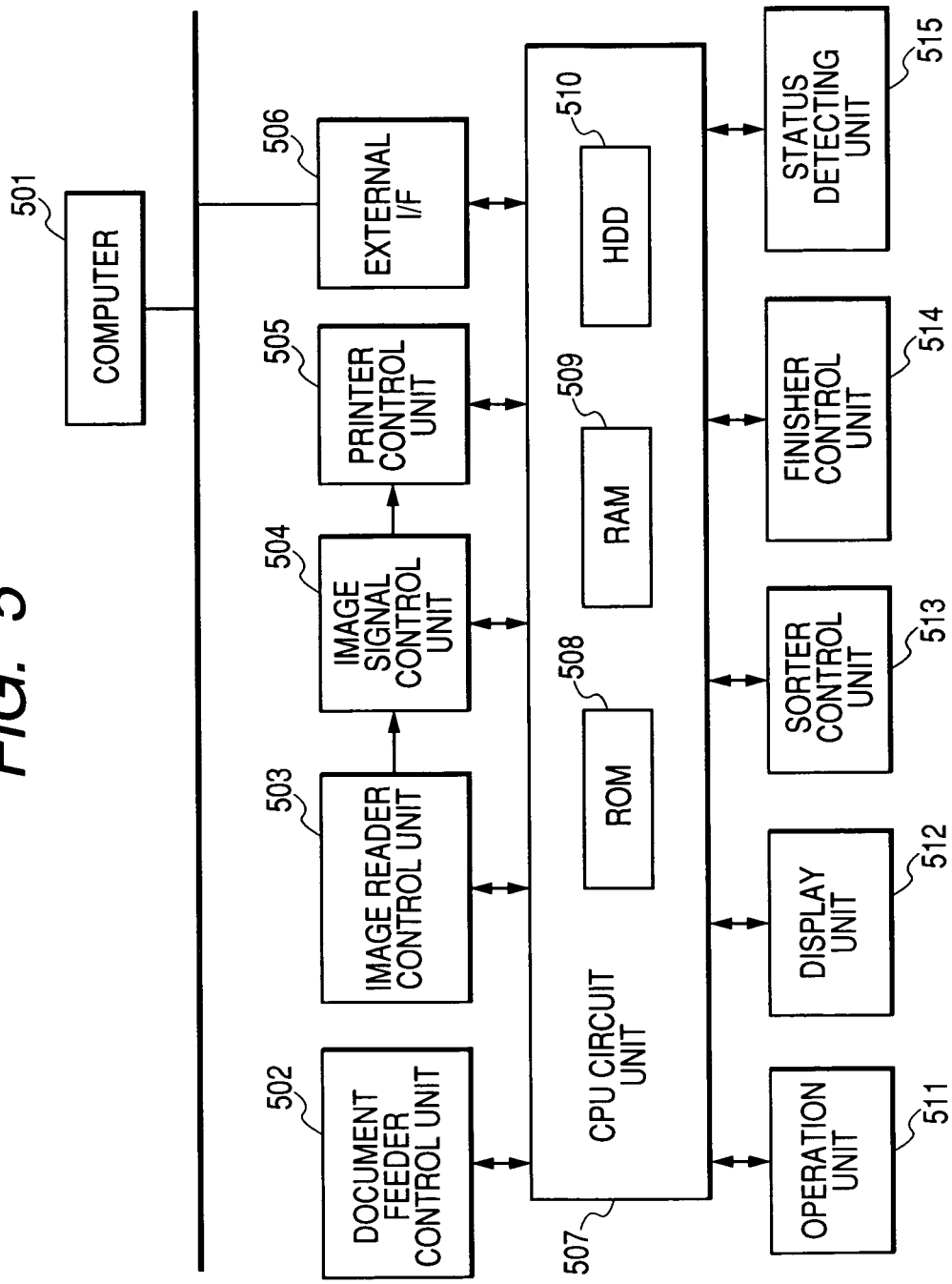
FIG. 5 is a block diagram showing a construction of a controller for controlling a whole image forming apparatus.

Subsequently, FIG. 5 is a block diagram showing a construction of a controller for controlling the whole image forming apparatus.

As shown in FIG. 5, the controller has a CPU circuit unit 507. A CPU (not shown), a RAM 508, a ROM 509, and a hard disk drive (HDD) 510 are connected to the CPU circuit unit 507. The CPU circuit unit 507 integratedly controls blocks 502, 503, 504, 505, 506, 511, 512, 513, 514, and 515 in accordance with a control program stored in the ROM 509. The RAM 508 is used to temporarily hold control data and used as a work area for an arithmetic operating process accompanied with the control. The HDD 510 stores information necessary for the control program and information received from the blocks 502, 503, 504, 505, 506, 511, 512, 513, 514, and 515, respectively.

An original feeding apparatus (document feeder) control unit 502 drives and controls a document feeder (not shown) on the basis of an instruction from the CPU circuit unit 507. An image reader control unit 503 drives and controls a scanner unit (not shown), an image sensor (not shown), and the like and transfers an analog image signal outputted from the image sensor to an image signal control unit 504.

The image signal control unit 504 converts the analog image signal into a digital signal, thereafter, executes various processes to the digital signal, converts the digital signal into a video signal, and outputs the video signal to a printer control unit. 505. An external interface (I/F) 506 executes various processes to a digital image signal inputted from a computer 501 through a LAN interface, converts the digital image signal into a video signal, and outputs the video signal to the printer control unit 505. The external I/F 506 communicates with a device managing apparatus (not shown) through the LAN interface. The processing operation of the image signal control unit 504 is controlled by the CPU circuit unit 507. The printer control unit 505 drives an exposure control unit (not shown) on the basis of the inputted video signal.

An operation unit 511 has a plurality of keys for setting various functions regarding the image creation, a display unit for displaying information showing a setting mode, and the like. The operation unit 511 outputs a key signal corresponding to the operation of each key to the CPU circuit unit 507 and displays corresponding information on the basis of the signal from the CPU circuit unit 507 onto a display unit 512.

A sorter control unit 513 and a finisher control unit 514 are made operative on the basis of the signal from the CPU circuit unit 507 in accordance with an input from the user through the external I/F 506 or settings from the operation unit 511. A status detecting unit 515 collects status information from respective portions, discriminates an abnormality detection or the like, and notifies the CPU circuit unit 507 of a discrimination result. In accordance with this notification, the CPU circuit unit 507 displays the abnormality to the computer 501 or the like through the display unit 512 or the external I/F 506.

Figure 6:
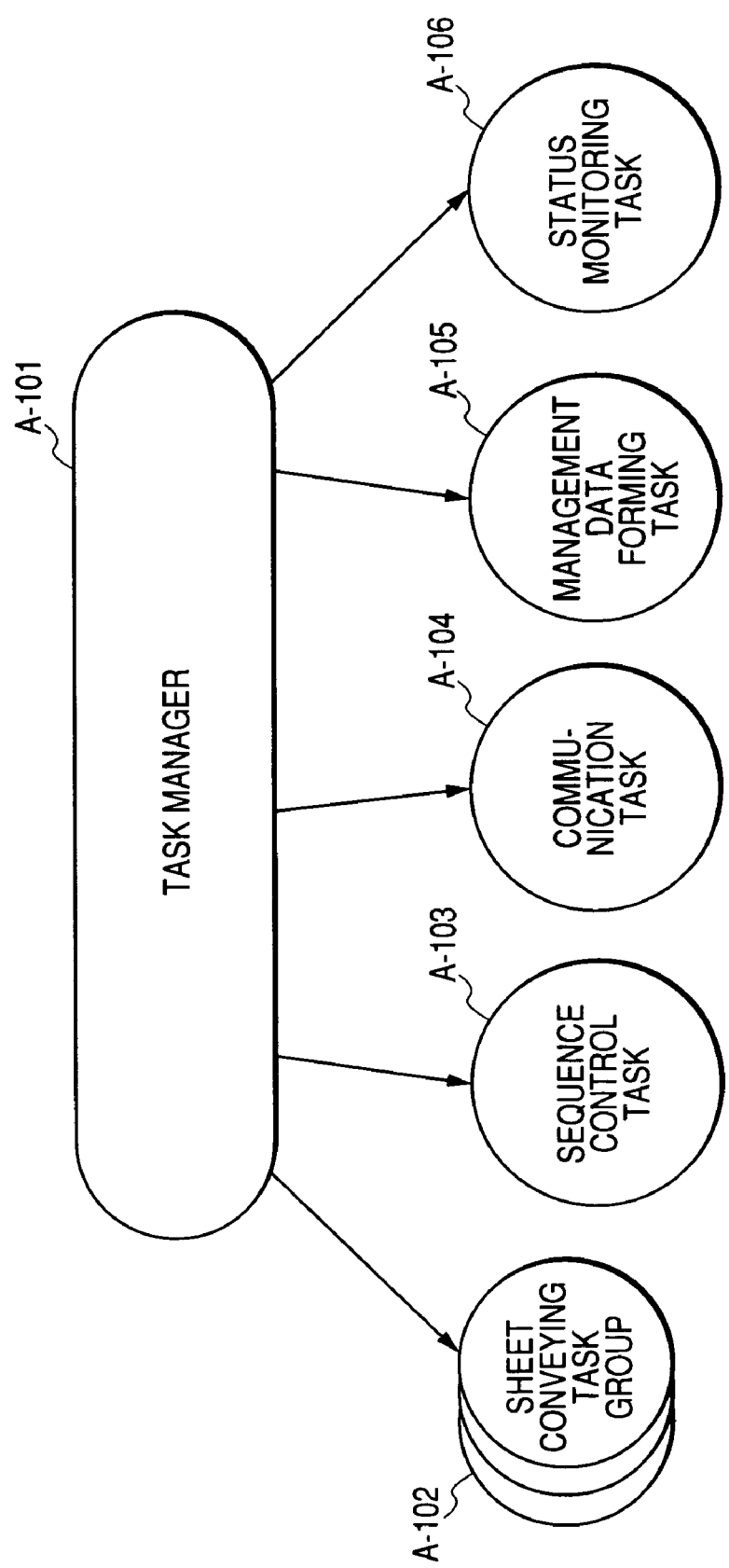
FIG. 6 is a constructional diagram of software of the image forming apparatus.

FIG. 6 shows a constructional diagram of software of the image forming apparatus.

A task manager A-101 simultaneously manages a plurality of tasks. A sheet conveying task group A-102 is a group of tasks for conveying an original and a sheet on which an image is formed. A sequence control task A-103 is a task for managing the whole image forming apparatus. A communication task A-104 is a task for communicating with the device managing apparatus. There is a management data forming task A-105 to form data for remote management in the embodiment.

In the image forming apparatus, the counting operation is executed per sheet size, per mode, per sheet type, and per color every image creation. The counting operation is executed by the management data forming task A-105 and count results are stored into a memory device in the image forming apparatus.

Similarly, status information regarding a paper jam, an error, an alarm, or the like is stored in a predetermined format into the memory device in the image forming apparatus.

Further, a counter showing an exchange life and a use frequency of consumable component parts (hereinafter, this counter is referred to as a parts counter) is provided for each unit in the image forming apparatus. The count results obtained in the management data forming task A-105 are stored in the memory device in the image forming apparatus.

When a status monitoring task A-106 of the image forming apparatus detects the abnormality (jam, error, alarm) in the image forming apparatus or detects a preset status change of the device, the status is stored in the memory device in the image forming apparatus in the management data forming task A-105.

A fundamental construction of the invention has been described above. A method of rebooting the information collecting apparatus 1 without missing a print count number of the invention will be described in detail hereinbelow with reference to FIGS. 7 to 11.

FIG. 7 is a diagram showing an example of registration/deletion setting items of a monitoring image forming apparatus in the present system. In the case of registration, either a network connection or a serial (local) connection is selected as a connecting form. In the case of the network connecting form, a model number, an IP address, and an MAC address for unconditionally identify the device in the information collecting apparatus become indispensable items to be inputted. In the case of deletion, the monitoring image forming apparatuses are displayed to a list together with additional information and the image forming apparatus to be deleted is selected from this list.

FIG. 8 is a table showing an example of holding information regarding the monitoring image forming apparatus in the present system. An ID to unconditionally identify the device as a system and, in the case of the network connection, the IP address to unconditionally identify the device on the network are held. In the case of the serial connection (local connection), a value which cannot exist as an IP address, for example, "0.0.0.0" is held as an IP address, thereby showing that the connecting form is the serial connection (local connection).

Figure 9:
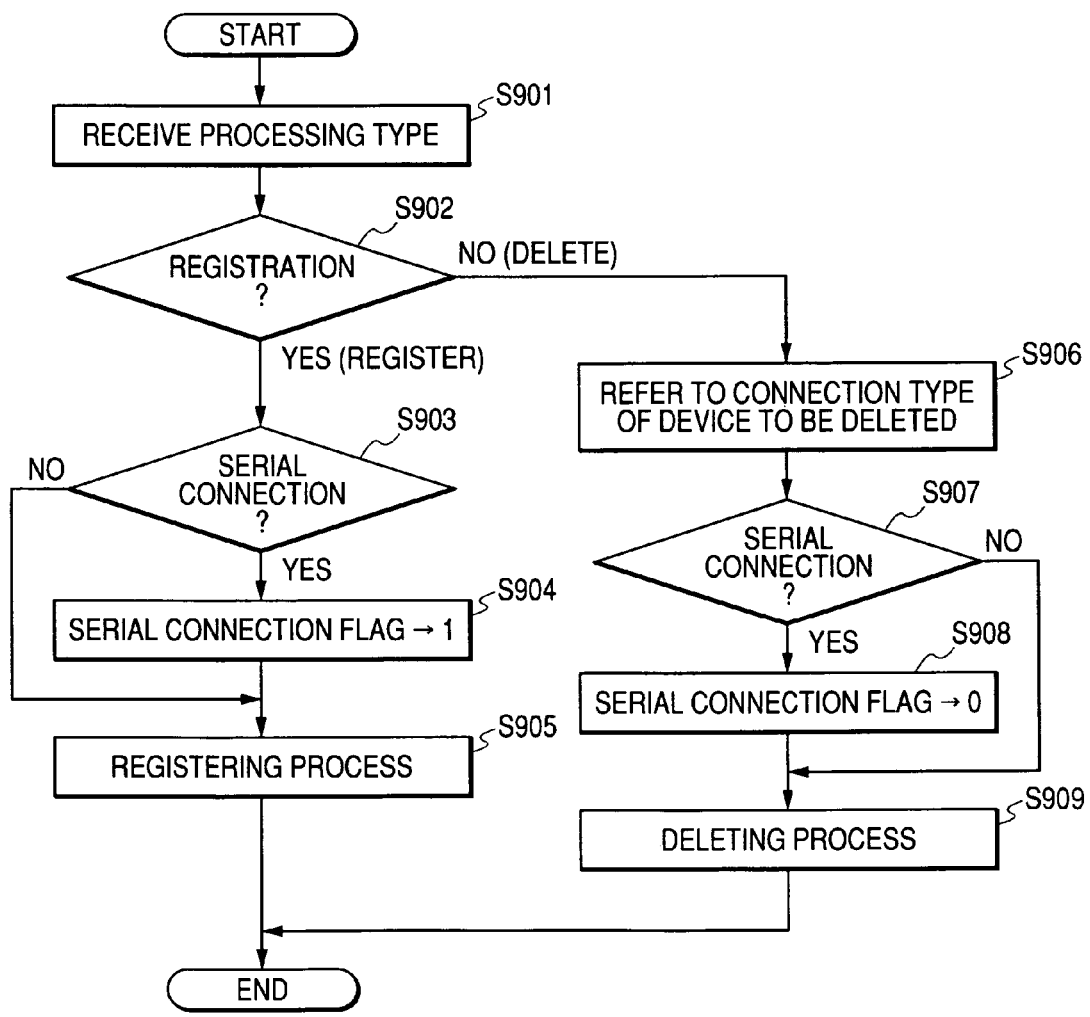
FIG. 9 is a flowchart showing the registering/deleting operation of the monitoring image forming apparatus.

A registering process of the monitoring image forming apparatus in the information collecting apparatus 1 will be described in detail with reference to FIG. 9. A program regarding the flowchart of FIG. 9 has been stored in a memory such as a flash ROM or the like of the information collecting apparatus 1 and is executed by the CPU of the information collecting apparatus 1. In an initial state of the present system, the number of devices as targets to be monitored is equal to 0 and a serial connection flag is set to 0 showing that there is no serial connection device. In step S901, designation of a type of process for registration or deletion is received. If it is determined in step S902 that the processing type indicates the registration, step S903 follows. If it is determined in step S903 that the connecting form indicates the serial connection, step S904 follows and "1" is set into a serial connection flag. In step S905, information of the registered device is held and the number of monitoring devices is counted up.

If it is determined in step S902 that the processing type indicates not the registration but the deletion, a connection type of the device to be deleted is referred to in step S906. If it is determined in step S907 that the connecting form indicates the serial connection, "0" is set into the serial connection flag in step S908. In step S909, the designated device information is deleted and "1" is subtracted from the number of monitoring devices.

Figure 10:
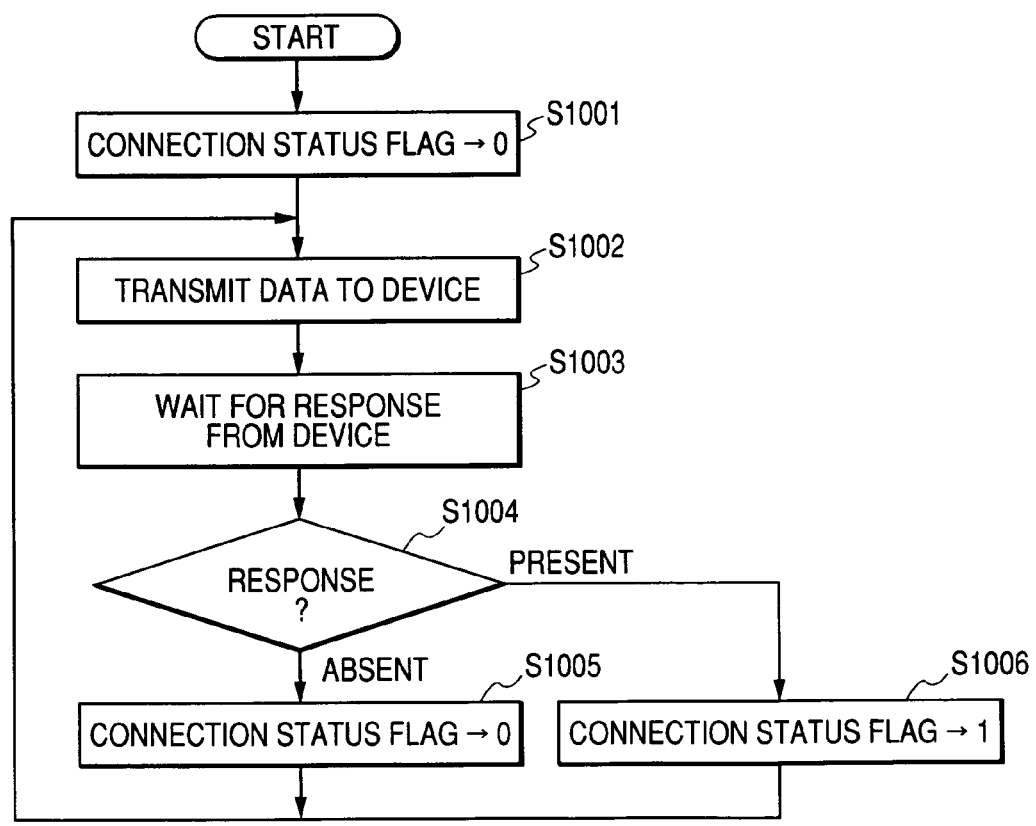
FIG. 10 is a flowchart showing the connection status monitoring operation of the information collecting apparatus and a serially-connected image forming apparatus.

A process for monitoring the connection status of the device and the information collecting apparatus through the serial I/F will now be described with reference to FIG. 10. A program regarding a flowchart of FIG. 10 has been stored in the memory such as a flash ROM or the like of the information collecting apparatus 1 and is executed by the CPU of the information collecting apparatus 1.

In step S1001, "0" showing that a power source of the device is OFF is set as an initial state of the connection status flag. In step S1002, data to request a response from the device is transmitted. The apparatus waits for the response from the device for a few seconds in step S1003. If it is determined in step S1004 that there is no response from the device during the response waiting time, "0" is set into the connection status flag in step S1005. If it is determined in step S1004 that there is the response, "1" is set into the connection status flag in step S1006.

The rebooting process will now be described in detail with reference to FIG. 11. A program regarding a flowchart of FIG. 11 has been stored in the memory such as a flash ROM or the like of the information collecting apparatus 1 and is executed by the CPU of the information collecting apparatus 1.

In step S1101, the serial connection flag is referred to and if it is determined that this flag is equal to "1" showing that the serial connection device is included in the monitoring targets, step S1102 follows. The connection status flag is referred to and if it is determined in step S1102 that the power source of the device is turned on and this flag is equal to "1" showing that the device is communicating with the information collecting apparatus, the processing routine is returned to step S1102. If it is determined in step S1102 that the power source of the device is turned off and the connection status flag is equal to "0" showing that the device is not communicating with the information collecting apparatus, the processing routine advances to step S1103 and the rebooting process of the information collecting apparatus is executed. It is also possible to construct the system in such a manner that if YES (the flag is "1") in step S1102 and this flag is held after the elapse of a predetermined time, the time-out occurs and the processing routine is finished without executing the rebooting process.

If it is determined in step S1101 that the serial connection flag is equal to "0" showing that the serial connection device is not included in the monitoring targets, the rebooting process of the information collecting apparatus is executed in step S1103.

Figure 11:
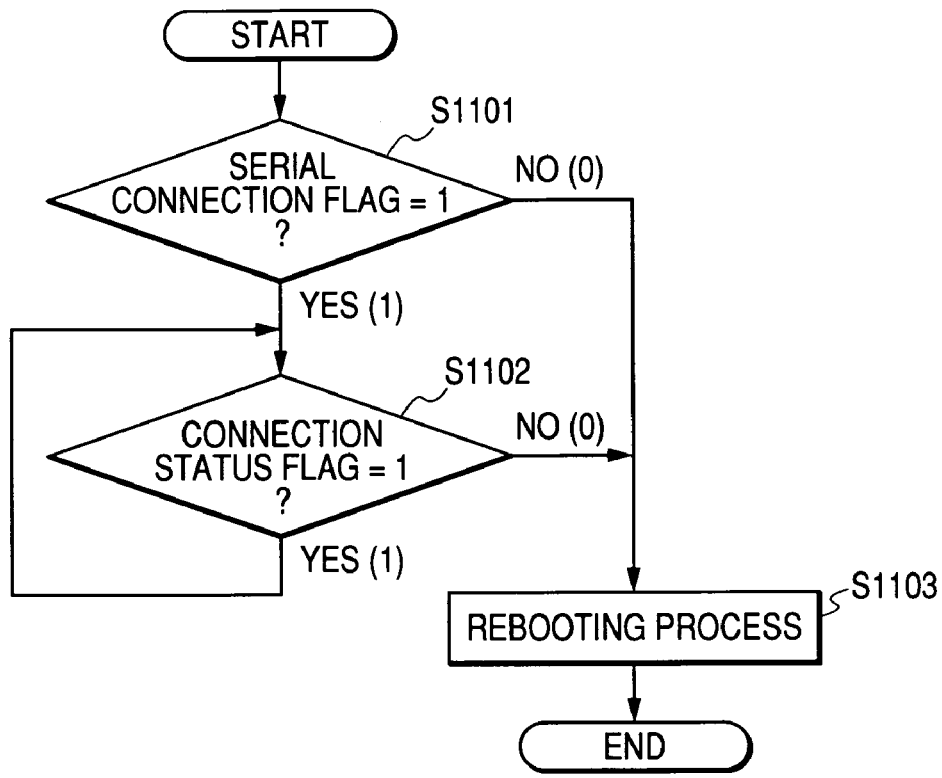
FIG. 11 is a flowchart showing the discriminating operation for executing a rebooting process.

If the rebooting process described in FIG. 11 has been registered as a regular process, the rebooting process is activated at predetermined time and date, or it is activated when a processing request including the rebooting is received from the remote monitoring apparatus 2 or 6.

OTHER EMBODIMENTS

Figure 12:
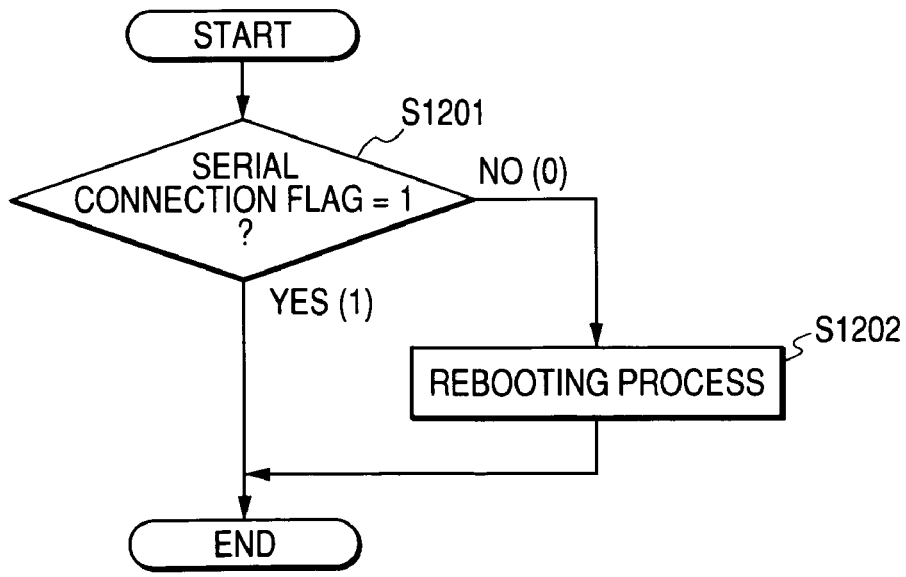
FIG. 12 is a flowchart showing the discriminating operation for executing another rebooting process.

Although the connection status flag has been discriminated in step S1102 in the processes of FIG. 11 mentioned above, as shown in FIG. 12, it is also possible to construct the system in such a manner that the connection status flag is not discriminated but if it is determined in step S1201 that the device of the type corresponding to the serial connection is included, the rebooting process is not executed, and if it is determined in step S1201 that the device of the type corresponding to the serial connection is not included, step S1202 follows and the rebooting process is executed.

Although the embodiment has been described with respect to the example of the serial connection, the invention can be realized in another connecting form such as a local connection.

As described above, according to the embodiments, the rebooting process can be executed as necessary without missing the count number.

What is claimed is:

1. An information collecting apparatus, comprising:
    an obtaining unit configured to obtain counter information from an image forming apparatus;
    a transmission unit configured to transmit the counter information obtained by said obtaining unit to a remote monitoring apparatus;
    a discrimination unit configured to discriminate whether the image forming apparatus is connected locally or via a network;
    a detection unit configured to send a request for response to the image forming apparatus and detect a response to the request from the image forming apparatus, if said discrimination unit discriminates that the image forming apparatus is connected locally; and
    an executing unit configured to execute a rebooting process of said information collecting apparatus, if said detection unit does not detect the response from the image forming apparatus, wherein said executing unit does not execute the rebooting process, if said detection unit detects the response.

2. An information collecting apparatus according to claim 1, wherein the image forming apparatus connected locally does not have ability to receive an accumulated print count number obtaining request, but has ability to merely notify that printing has been performed one by one upon printing.

3. An information collecting apparatus according to claim 1, wherein said executing unit executes the rebooting process, if said detection unit does not detect the response from the image forming apparatus, or if said discrimination unit discriminates that the image forming apparatus is connected via the network.

4. A method carried out in an information collecting apparatus, comprising:
    an obtaining step of obtaining counter information from an image forming apparatus;
    a transmitting step of transmitting the obtained counter information to a remote monitoring apparatus;
    a discriminating step of discriminating whether the image forming apparatus is connected to the information collecting apparatus locally or via a network;
    a detecting step of sending a request for response to the image forming apparatus and detecting a response to the request from the image forming apparatus, if it is discriminated in said discriminating step that the image forming apparatus is connected locally; and
    an executing step of executing a rebooting process of the information collecting apparatus, if said detecting step does not detect the response from the image forming apparatus, wherein said executing step does not execute the rebooting process, if said detecting step detects the response.

5. A method according to claim 4, wherein the image forming apparatus connected locally does not have ability to receive an accumulated print count number obtaining request, but has ability to merely notify that printing has been performed one by one upon printing.

6. A method according to claim 4, wherein said executing step executes the rebooting process, if said detection step does not detect the response from the image forming apparatus, or if said discriminating step discriminates that the image forming apparatus is connected via the network.

7. A computer-readable medium storing, in executable form, a program for causing an information collecting apparatus to perform a method comprising:
    an obtaining step of obtaining counter information from an image forming apparatus;
    a transmitting step of transmitting the obtained counter information to a remote monitoring apparatus;
    a discriminating step of discriminating whether the image forming apparatus is connected to the information collecting apparatus locally or via a network;
    a detecting step of sending a request for response to the image forming apparatus and detecting a response to the request from the image forming apparatus, if it is discriminated in said discriminating step that the image forming apparatus is connected locally; and
    an executing step of executing a rebooting process of the information collecting apparatus, if said detecting step does not detect the response from the image forming apparatus, wherein said executing step does not execute the rebooting process, if said detecting step detects the response.

8. A computer-readable medium according to claim 7, wherein the image forming apparatus connected locally does not have ability to receive an accumulated print count number obtaining request, but has ability to merely notify that printing has been performed one by one upon printing.

9. A computer-readable medium according to claim 7, wherein said executing step executes the rebooting process, if said detection step does not detect the response from the image forming apparatus, or if said discriminating step discriminates that the image forming apparatus is connected via the network.

* * * * *